United States Patent
Watts et al.

(10) Patent No.: US 7,453,993 B2
(45) Date of Patent: Nov. 18, 2008

(54) APPARATUS AND METHOD FOR A WORLD WIDE WEB-BASED DIRECTORY WITH AUTOMATIC CALL CAPABILITY

(75) Inventors: Ronald F. Watts, Lewisville, TX (US); William E. Dyer, Plano, TX (US); Mitul B. Kadakia, Plano, TX (US)

(73) Assignee: Alcatel Lucent, Paris (FR)

( * ) Notice: Subject to any disclaimer, the term of this patent is extended or adjusted under 35 U.S.C. 154(b) by 1125 days.

(21) Appl. No.: 10/736,958

(22) Filed: Dec. 16, 2003

(65) Prior Publication Data

US 2005/0129193 A1    Jun. 16, 2005

(51) Int. Cl.
*H04M 1/64* (2006.01)

(52) U.S. Cl. ............ 379/88.17; 370/261; 370/352; 705/8

(58) Field of Classification Search ........... 370/352, 370/261; 379/88.17; 705/8
See application file for complete search history.

(56) References Cited

U.S. PATENT DOCUMENTS

| | | |
|---|---|---|
| 6,185,194 B1 | 2/2001 | Musk et al. |
| 6,249,576 B1 | 6/2001 | Sassin et al. |
| 6,430,282 B1 | 8/2002 | Bannister et al. |
| 6,829,236 B1 * | 12/2004 | Archer ............ 370/353 |
| 7,317,695 B2 * | 1/2008 | Mayer et al. ........ 370/261 |
| 2002/0054671 A1 | 5/2002 | Wiener et al. |
| 2002/0114318 A1 | 8/2002 | Rines et al. |

FOREIGN PATENT DOCUMENTS

WO    WO 03/028357 A1    4/2003

* cited by examiner

*Primary Examiner*—Gerald Gauthier

(57) ABSTRACT

Apparatus, and an associated method, for providing a Web-based directory with automatic dialing capabilities that may be used by the user of a standard wireline or cellular telephone to establish contact with entities having SIP phones or other IP-based communication devises. The Web-based directory includes not only the names of various entities, but information on how to establish voice contact with them as well such as IP addresses or other contact numbers. A Web-based directory user establishes an Internet connection and retrieves one or more Web pages of the Web-based directory, selecting from them one or more entities from among those listed. Having made this selection, the user requests initiation of a voice-communication session, whereupon a conferencing system in communication with the Web-based directory application server initiates a call to both of the selected entity or entities using applicable communication channels and the user so that the desired voice-communication session can be established.

22 Claims, 3 Drawing Sheets

APPARATUS AND METHOD FOR A WORLD WIDE WEB-BASED DIRECTORY WITH AUTOMATIC CALL CAPABILITY

The present invention relates generally to Internet-based directory and communications services. More particularly, the present invention relates to apparatus, and an associated method, that provides a service though which users can selectively and automatically establish contact with entities listed on a Web-based directory, especially those entities using an IP-based voice connection, which are often difficult or virtually impossible to contact through a standard telephone system.

BACKGROUND OF THE INVENTION

Since its inception, the Internet has grown from a relatively limited network of computers and small computer networks into a vast worldwide network that can be used to connect almost any computing device with any other, given only a modest level of network communication equipment and software. The Internet is made possible by a large number of interconnected devices that route communications from their source to destination, generally through a number of intermediate devices.

A communications protocol referred to as TCP/IP (transmission control protocol/Internet protocol) provides a standard scheme for effecting these communications so that regardless of the information being transmitted, the communicating devices are ultimately able to send it to, and through one another. In general, information being transmitted through the Internet is broken into coded packets (relatively small segments of data) and each packet is addressed and numbered so that it can be routed to its destination independently of the others. The individual packets carrying pieces of the information may in fact take different routes as the communication nodes along their route continually decide the best route available at the time of transmission. Once at their destination, associated packets are collected and assembled in their proper sequence to recreate the transmitted information.

A wide variety of information can be sent using this standard protocol, in essence because the contents of each packet to not have to be interpreted or executed by each communication node, only retransmitted toward its goal. This enables one computer to send, for example, a text file, an audio file, or a graphics file to another computer where it will be received, stored, and presented to the user in an appropriate fashion. The intermediate routing devices need not be capable of perceiving the eventual purpose of the transmitted information. Encrypted information can also be transmitted without the need to decrypt it until the intended recipient wishes to do so.

The ability to send this wide variety of information through the Internet has been enhanced by constant upgrades to the transmission equipment that makes up the Internet. By the same token, advances in the speed and storage capability of consumer computing equipment have enabled individual users to be able to create and reproduce multimedia presentations including, for example, sound and graphics. Real-time (or streaming) transmissions can be made, meaning that a dynamic presentation created or performed at one node can be transmitted to one (or many) others as it is occurring, and the recipient or recipients can continually receive and recreate the transmitted presentation with very little delay. Similarly, a conversation at one location can be encoded and transmitted to another using a technology called voice over Internet protocol (VoIP). The recipient can decode and play the received VoIP transmission so rapidly that the parties perceive little difference from a standard telephone call.

There are a number of other ways that users take advantage of this new communication ability. One of the most widely-used ways is simply to find information that the user would like to know, information that they would otherwise have to obtain from another source that might be difficult or virtually impossible to access. The ability to retrieve information through the Internet has been greatly aided by the development of the World Wide Web (WWW, or simply "the Web"). The Web, generally speaking is a set of protocols that provide a manner of storing information in computer databases using a standard language such as HTML (hypertext markup language). A database file may hold a collection of this information that is referred to as a Web page, owing to the way it is delivered as a unit to a user who requests it. A collection of Web pages are said to form a Web site, available at a single Internet address. A single computer database may hold the information relating to one, or to a great many Web sites.

The information at a Web site is available on either an open or a limited basis to those who know the address from which it can be retrieved. Each computing device connected to the Internet has an Internet address (or a number of addresses) though which it can be contacted. Internet addresses are long strings of numbers, so Web sites frequency use as their notorious address a uniform resource locator (URL), which is often a more memorable series of characters (such as "www.alcatel.com"). Internet devices are provided with tables for translating URLs into addresses usable to them in routing information. Internet users wishing to access the information at a Web site may enter the address on a screen provided by any of several available programs called Web-browsers. Their computer then transmits a request to the computer storing the Web site and requests that one or more pages of information be returned.

The first page sent in response to a request made to a URL-type address is often called the Web site's "home page" (unless a more particular specification to another page is included with the address). When this information is sent back to the user, the user's Web browser automatically translates it into a presentation that may include text and graphics displayed on the computer's display monitor and sound played through speakers. The retrieved information may also include instructions for retrieving additional Web pages from that Web site, or for requesting information from a different Web site entirely. These instructions, invisible to the user, are executed when the user performs a certain action. Commonly, the user uses a mouse to manipulate an on-screen pointing device until it points at an area of the screen at which a particular word, picture, or other visual cue is displayed. When the pointer is appropriately positioned, the user "clicks" by pushing a mouse key. (Portions of the display that can be activated in this manner in order to access other Web sites are often called "hyperlinks", or simply "links".) Assuming the instructions associated with this action to include a currently valid request for information from an accessible source, the on-screen display of the user's computer is replaced by a different one whenever the new Web-page information has been transmitted and becomes available.

To access a particular Web site, the user must have a URL (or actual Internet address) for the site, or connect through another site using a link as described above. Many URLs are commonly advertised and are often easy to remember, so at times this is not difficult. There is a limit to the number of addresses that any user can remember, however, so Web browsers usually keep track of the addresses of previously-visited sites so that the information there can be accessed again at a later time, assuming it remains available at that address.

In many cases though, the user is not even aware of whether certain information is available at any particular Web site, and therefore has no address to enter. In this circumstance, the user can employ a search engine to see if the desired information can be found. Most search engines are themselves available at Web sites, where the user is offered a window in which to type in certain key words or phrases that the search engine, when commanded to do so, will use to search through a previously-compiled index or database of available Web sites and their content. A results list of promising Web sites is produced for the user to view, the list generally containing links to the sites listed there. Once found, of course, the user may elect to store the address of a useful Web site using their Web-browser program (a process commonly called bookmarking). As should be apparent, search engines are very useful devices. The fact that the produced list may be thousands of items long, however, may detract from their usefulness, especially for an inexperienced user, or one searching for hard-to-describe information.

Links to other sites may also be available in directories, or lists that have already been compiled and stored at Web sites. Directories are particularly useful for finding entities such as individuals, businesses, or government offices, and information relating to them. Typically, the directory will list entities meeting certain criteria along with contact information related to the entity (similar to the manner in which a Yellow Pages directory lists those businesses that pay to be listed). In the case of an on-line directory, this contact information may include Web sites associated with the entities (sometimes including actual links), if available, as well as telephone numbers or street addresses. Naturally, a directory may provide one or several types of contact information for each listed entity.

When a user wishes to contact a particular entity, perhaps to buy something or to provide or receive specific information, the user may access an on-line directory to determine the mailing address or phone number appropriate for doing so. The entity's Web site may also be provided. Some company Web sites even allows users to activate links that allow them to send an email message, either to a specific person or to a central mailbox from which it will (hopefully) be routed in a timely fashion. At times, however, a telephone conversation is the best or the only way to efficiently contact the entity and communicate the needed information. In some cases the entity may not even have a Web site to which the user can look first for needed direction. In these cases the user will generally have to remember, write down, or print out the telephone number and then make the call through a standard telephone network.

Moreover, when the entity is accessible by a voice communication device operable according to the Internet protocol (IP) scheme (via the Internet), they may be very difficult to access using a standard telephone connected though the PSTN. This often remains true even if the IP address is known or found in a standard directory, when the PSTN phone will have no way of 'dialing' a number associated with that address. And, of course, contacting the IP-based telephone via a standard PSTN network is impossible if the address itself is unknown.

It is in light of this background information that the significant improvements of the present invention have evolved.

SUMMARY OF THE INVENTION

The present invention, accordingly, advantageously provides apparatus, and an associated method, by which to provide Web-based directory services via a communication network such as the Internet.

In one aspect, the present invention is a server for providing Web-based directory services for contacting entities that use an Internet protocol (IP) device for voice communications in response to user requests, the server for communicating with users via the communications network and for communicating with a database used for storing at least one Web-based directory, the at least on Web-based directory including information relating to at least one and preferably a plurality of entities that the user may want to contact. The server is further for communicating with a conferencing system and directing it to place a voice calls to the user and to the at least one entity in attempt to establish a voice communication session between the user and the at least one entity. The server is preferably able to monitor the calls so that is can record when the voice communication sessions have begun and ended, and to record information about the calls for billing purposes. The server may also be used for establishing voice communication sessions between non-IP devices as well.

In another aspect, the prevention is a method of providing Web-based directory services for contacting entities that use an Internet protocol (IP) device for voice communications, including the steps of receiving a user request for directory information, retrieving directory information from a database and transmitting it to the requesting user, in one embodiment after requesting a password or other information related to the user. The method continues when a request is received from the user to establish a voice communication session with one or more of the listed users, whereupon a conferencing system is provided with telephone numbers or other contact information for the user and each one of the entities to be involved in the voice communication so that the conferencing system can place a call to each in an attempt to establish voice communication between two or more of the parties.

In yet another aspect, the present invention is a system including a Web-based directory server in communication with a communication network such as the Internet so that it can receive user requests for Web-based directory services, a database for storing the Web-based directory, and a conferencing system coupled to the server for establishing a voice communication session between the user and an entity using an IP-device for voice communications that is listed in the Web-based directory that the user selects.

A more complete description of the present invention and the scope thereof can be obtained from the accompanying drawings that are briefly summarized below, the following detailed description of the presently-preferred embodiments of the invention, and the appended claims.

DETAILED DESCRIPTION

The present invention is directed to a manner of implementing a Web-based directory that can be used to automatically put the user in voice contact with entities listed there, and in particular with those entities accessible through, or even only through a device operating according to the Internet protocol (IP). In a preferred embodiment, the Web-based directory itself is incorporated as a Web site accessible to users through the Internet.

The users themselves may access the Internet in a variety of ways. For example, a user may go "on-line" though a standard telephone connection to a server operated by an Internet service provider (ISP). The ISP server is continuously connected to the Internet and will generally enable access for a great many users in this fashion. Another user may be connected to a local area network (LAN) that in turn maintains an Internet connection. A given user may simply be directly connected to the Internet as well, although a direct connection is not typical for ordinary consumers.

In describing the present invention, however, the type of connection used by a given user is not material unless explicitly made so in reciting a particular embodiment. Note also that the term "user" is sometimes for convenience actually used to refer to a user device, or to a device being operated by a user. Where it is material to know whether a particular person, a particular device, or both are being discussed, the distinction will be pointed out explicitly or apparent from the context. In general, it will not be material what specific device or type of device is being used except that the appropriate manner of communicating with the device will vary according to its nature.

Figure 1:
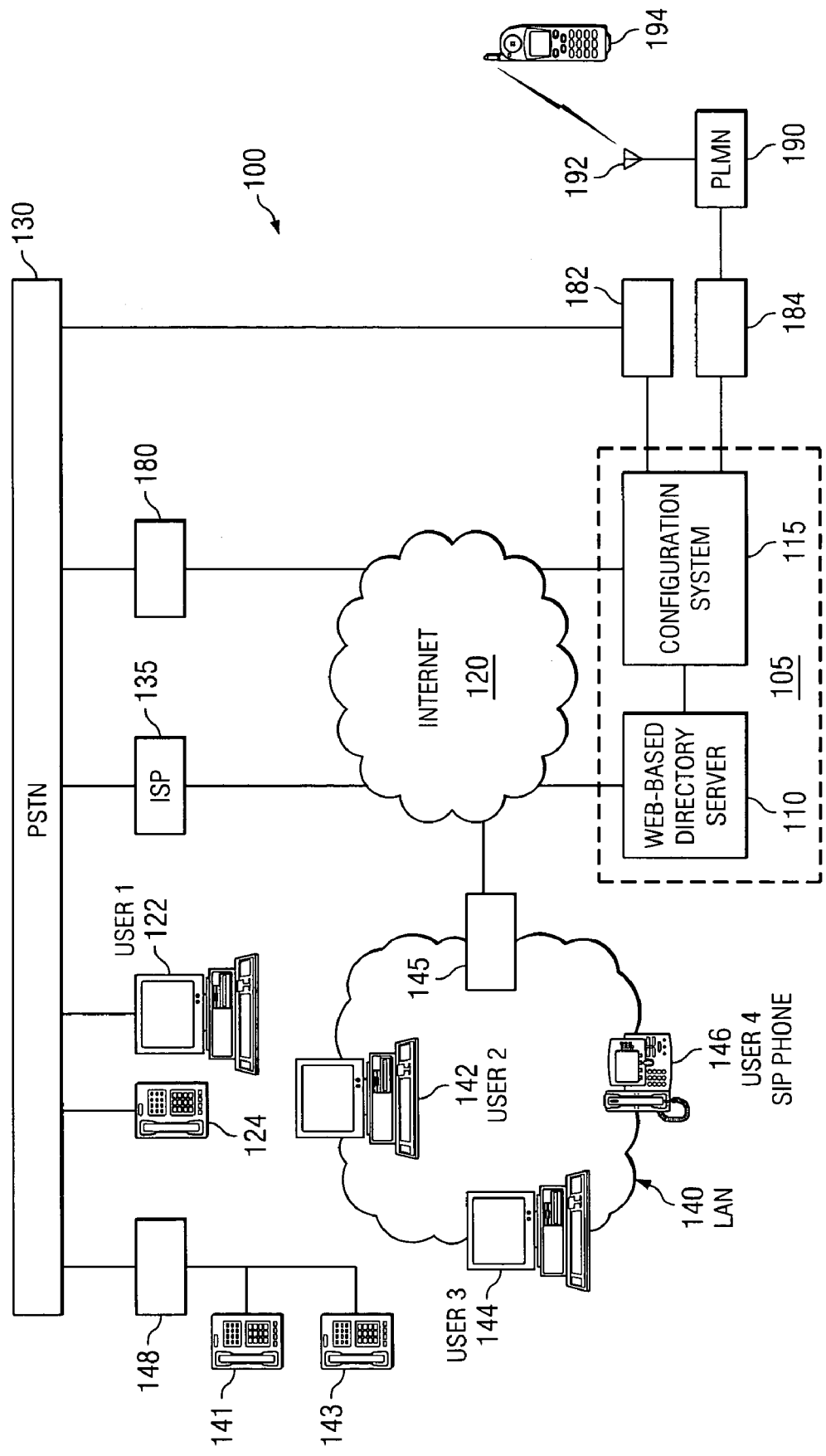
FIG. 1 is a simplified block diagram illustrating the interconnection of selected components of a system for providing a Web-based directory according to an embodiment of the present invention.

FIG. 1 is a simplified block diagram illustrating the interconnection of selected components of a system 100 for providing a Web-based directory according to an embodiment of the present invention. Initially, it is noted that this embodiment is exemplary, and the various components illustrated are not required unless recited as such. In the embodiment of FIG. 1, system 100 includes a Web-based directory automatic-call system 105, which includes Web-based directory server 110 and conferencing system 115. Web-based directory server 110 maintains a continuous connection to the Internet 120 and is therefore accessible to users connected thereto.

In the embodiment of FIG. 1, User 1 uses PC 122 to access the Internet. PC 122 includes a modem (not shown) through which a connection to a public switched telephone network (PSTN) 130. Though shown as a single block, PSTN 130 includes many interconnected switching devices for establishing a circuit from each calling device to the called device (or devices) and is sometimes referred to as the plain old telephone system (POTS). In this case PC 122 uses PSTN 130 to call ISP server 135, which maintains an Internet connection, and in this way may locate and access the Web-based directory server 110. User 1 is also equipped with a standard telephone instrument 124 through which conventional telephone calls may be made using PSTN 130. Preferably, separate telephone lines connect PC 122 and telephone 124 to PSTN 130 so that they may be used at the same time. Alternately User 1 may employ a multiplexer (not shown) so that both PC 122 and telephone 124 may be used simultaneously over a single line.

Similarly, User 2 and User 3, using PC 142 and 144, respectively, form a part of LAN 140 that may establish an Internet connection through LAN server 145. The LAN server 145 may, and typically does include a number of other applications accessible to the users of LAN 140. User 2 and User 3 are equipped with telephone instruments 141 and 143, respectively, which in this embodiment are connected to the PSTN 130 through a private branch exchange (PBX) 148. Configurations of this type are typically found in business applications, though of course there is no requirement that this is universally the case. In such environments, a great many computers and other devices may be included in LAN 140.

Also connected to LAN 140 is SIP phone 146. An SIP phone uses session initiation protocol (SIP) to establish a voice connection via this Internet, and provides User 4 with the ability to make telephone calls without accessing PSTN 130 at all. To call a telephone connected only to PSTN 130, VoIP communications from SIP phone 146 are routed through a gateway such as PSTN gateway 180. A gateway is a device that allows communications to be exchanged between different networks, effecting whatever format or protocol translations are necessary for doing so. Of course, SIP phones may communicate with each other via the Internet 120 without the need for such a device.

Similarly, a software application resident, for example, on PC 122 may be used to make voice calls through its connection to the Internet 120. Naturally, for this to occur PC 122 must have available appropriate components such as a peripheral microphone and speakers (not shown). These devices may in some cases be incorporated into a handset similar to that of an ordinary telephone instrument. Although similar in effect to an SIP phone, this configuration is generally not referred to as such simply because it is not dedicated to this single function, but the PC application is sometimes called a softphone.

SIP phones and softphones have the advantage of being able to engage in voice communication over the Internet. In practical terms, this often means that they are able to avoid toll charges associated with voice calls through a standard wireline or cellular system. They may also be able to easily relocate from place to place with little or no involvement from a network operator, as long as a suitable Internet connection is available. A SIP phone may be particularly advantageous in this sense; as it is a dedicated instrument and easier to move from place to place than are many computers having appropriate audio equipment. These advantages may make the use of a SIP phone the most desirable option in some businesses. As mentioned above, however, there are some drawbacks. In particular, SIP phone may be difficult to access using many wireline or cellular telephones, especially if their network does not provide ready support for subscribers wishing to make such calls. In addition, SIP phone may be difficult to contact because the necessary contact information is frequently difficult to find even if a call could be made using it.

In accordance with an embodiment of the present invention, conferencing system 115 is coupled not only to the Web-based directory server 110, but to the Internet as well. In addition, conferencing system may be coupled to a gateway 182 for communicating directly with the PSTN 110. Likewise, in the illustrated embodiment conferencing system 115 is also coupled to gateway 184 for directly communicating with public land mobile network (PLMN) 190, a wireless communication network. A wireless communication network is a network for voice and data communication that maintains a plurality of antennas spread across a geographic area for radio communication with mobile stations, for example exemplary antenna 192 and exemplary mobile station 194 shown in FIG. 1.

The conferencing system 115 is preferably able to communicate through a variety of different communications networks, directly or indirectly, so that it may automatically place calls to SIP phones and other entities and users when requested to do so (including but not limited to those networks shown in FIG. 1). Such a request comes from a user that has accessed the Web-based directory on the Web-based directory server 110 and requested that voice communication be established between it and one of the entities associated with a directory entry. This process will now be explained in more detail.

Initially, the Web-based directory of the present invention is populated with entries associated with entities that have elected or been chosen to have a presence there. These entities may be companies or individuals, businesses, government or charitable organizations, and so forth. In the case of a personal Web-based directory, that is one built, maintained, and used by only one user or small group of users, these users themselves may choose the entities to be represented. In one embodiment, they themselves enter the necessary information through a Web site designed for this purpose. In another embodiment the users may provide basic identifying information, such as names and addresses, to the Web-site directory operator who then gathers any necessary additional information and populates the database to create the personal Web-based directory. Note that in this disclosure, a user is one that seeks to find one or more entities listed on the Web-based directory, usually for the purpose of establishing a voice-communication session. Users may, of course, be directory entities themselves, listed there for other users to contact.

For populating a Web-based directory intended for use by a wide variety of users, entries may be selected by the directory owner or operator from publicly-available information. Alternatively, the owner may solicit businesses or individuals to submit their information for posting on the Web-based directory. The may be a charge for posting, for example in the case of a business directory that the operator may wish to make accessible to consumers without charge. Some Web-based directories may be used by organizations such as trade associations, universities, fraternal organizations, and so forth. These may include entries for entities as selected or approved by the organization or, if permitted, by its individual members. Naturally, it is preferred that the directory contents may be changed or altered by the operator whenever desirable. The operator may also provide a way for listed entities to change information associated with them on their own.

Once populated, the Web-based directory is made available for access. Generally speaking, of course, a Web-based directory located on a server in communication with the Internet may be accessed by any Internet user worldwide. Access may be limited, however, if so desired. This is usually accomplished using a password system, with the specific sign-in protocol varying according to design. Access to the directory may be limited by the directory operator, for example, to those who pay a subscription fee. Users may be asked to enter a password to sign in, or may have to use a particular identifiable device for access, or both.

In some applications access to the directory is limited simply to those users willing to provide information about themselves. This may be basic information such as state of residence, age, or income level, or it may be specific information such as name, address, and telephone number. This requirement may be imposed only to collect marketing information for use or sale by the Web-based directory operator. It may also be necessary to collect sufficient information so that the user may be billed for using the Web-based directory service, or for any transactions that occur as a result of the contact established there.

In one embodiment, a specific user or group of users may be given access to only a limited portion of the Web-based directory. This may be done because of a user request, such as where parents might want to prevent household access to entities offering adult-oriented products. The Web-based directory operator may also wish to limit access based on a user-subscription level, with more entries or options available to those who pay more. Directories operating on a subscription-fee basis may want to provide a limited number of entries free of charge, however, so that potential subscribers can test the service for themselves or so that they can make contact with the operator to ask questions or to actually subscribe.

Figure 2:
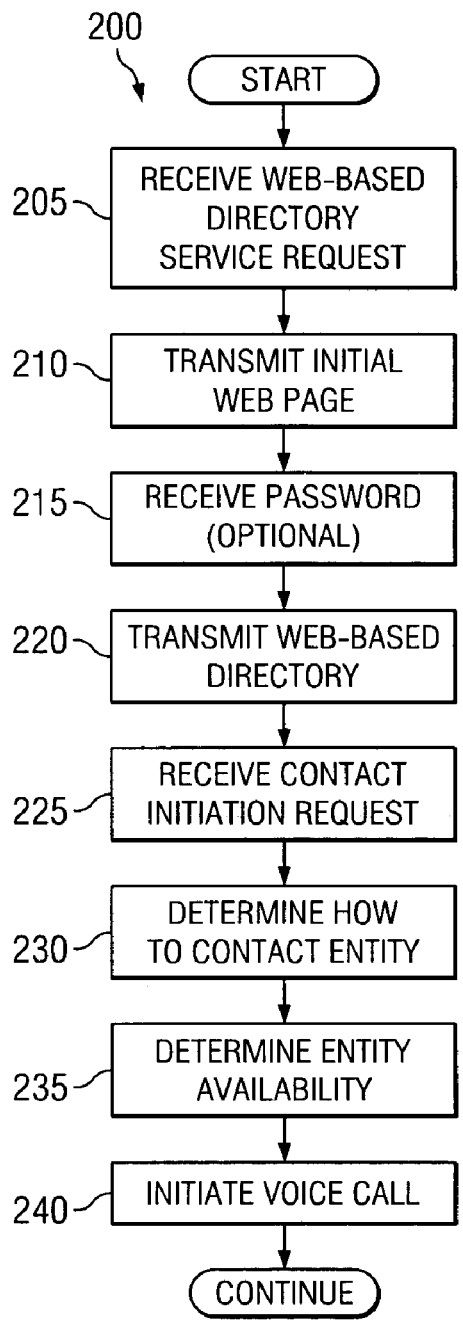
FIG. 2 is a flow diagram illustrating a method of providing automatic call Web-directory service to contact a SIP phone according to an embodiment of the present invention.

FIG. 2 is a flow diagram illustrating a method 200 of providing automatic call Web-directory service to contact to SIP phone according to an embodiment of the present invention. At START it is presumed that the Web directory server has been populated with entries as described above. When the Web-directory server receives a service request (step 205), that is when a user has contacted it though an Internet connection and asked to use the Web-based directory service, the server replies by sending a Web page to the requesting user (step 210). Sending a Web page, of course, means sending information sufficient for the user device to create a display image. The initially-sent page may actually include the entire Web-based directory, but may in many applications be simply a general introductory page. As alluded to above, this introductory material may include a request for the user to supply a password or other information, which may be required for the user to proceed.

This introductory period may continue and may include additional requests for information. That is, the user may request instructions for accessing or using the directory, provide payment information where appropriate, fill out interest profiles, or other similar activities. At some point, however, the Web-based directory server will receive a password or any other required information from the user (step 215). This step is in effect optional, as the server may require no such information in order for the user to proceed. Alternately, providing some or all of the requested information may be optional for the user, for example responding to queries seeking a preference on how to display the directory entries. In one embodiment, the user may but is not required to elect to receive only a portion of the Web-based directory and to indicate how the selected entries should be sorted for display.

The user will then be sent (all or part of) the Web-based directory (step 220) for display on a display device. As seen by the user, the Web-based directory may appear as simply a text-based list, or may include a number of GUIs (graphic user interfaces), which are icons or small pictures that the user will often recognize as being associated with the listed entity. Headings and other organizational aids may also appear. From this presentation, the user may then look for and select one or more entities for contact. When a selection is made by the user, such as by clicking on the GUI associated with an entity, a request is sent back to the Web-based directory server. When this initiation request is received (step 225), the server determines how to establish voice communication between the user and each of the entities selected (step 230).

Voice contact information for each entity listed on the Web-based directory, of course, may be collected at the time the directory is populated. This information will often be simply a number at which the entity may be reached, for example through the PSTN 110 or PLMN 190 (shown in FIG. 1). In one embodiment of the present invention, this contact information may include a plurality of numbers and criteria for how to determine which one to use. For example, a business or an individual may have one number to use during normal business hours and one at use at other times. The voice contact information may also very according to the identity of the caller, to the extent that information is available to the Web-based directory server 110. Those users identified as suppliers, for example, may use be placed in voice communication with one entity contact, while customers may be directed to another. Yet another point of contact for the entity may be used when the user initiating the contact is as yet unidentified.

In one embodiment, the Web-based directory server is also able to determine the availability of an entity, or of the entity at a particular contact number (step 235). For a SIP phone, this may involve determining whether the SIP phone is currently registered in association with a valid IP address (step not shown). A different address or number may be used if the entity is not available at a primary contact address or number. Or, if the contact address or number for the entity is not available (which may simply indicate that that it is already in use), a contact for providing the user with a recorded message may also be used. The recorded message may be stored in a database accessible to Web-based directory system 105, or may be made available when contact is actually established. When presented with a recorded message, the user may be able to leave a recorded voicemail message as well.

Note that step 230 also includes determining voice contact information for the user who is requesting that a voice communication be established. The user, of course, may supply this information at the time of making the initiation request or at the time of initially requesting access to the Web-based directory. Depending on the nature of the directory itself and the purpose for which the user is making access, the user may wish to make voice contact information available immediately. There may be reasons beyond privacy for withholding this information as well. For example, a user may have both a PSTN phone and a mobile phone, and may wish to use the later only when the former is unavailable at the time that the initiation request is being made. In other applications the Web-based directory system will store user contact information, which is then determined as soon as the user is identified, for example at login. The requesting user, after all, may be a listed directory entity as well. Where a user has not supplied voice contact information at the time that the call is initiated, however, the Web-based directory server may transmit a prompt or query to the user.

Once the Web-based directory server 110 has determined the appropriate voice contact information for the parties (step 230) and, where applicable, has determined that they are available (step 235), the conferencing system 115 initiates a conference call between them (step 240). This may involve attempting to call each of the parties simultaneously, or at least with no regard to which call is made or terminated first. Alternately, a call could first be place to one of the parties. Since the user has in many cases just supplied a voice-contact number, it may be most appropriate to actually establish a voice connection to that number first to verify that it is working and can be used at that time. The called entity may be notified at this time that a call setup is in progress, even if a voice connection with them is not yet being initiated.

Naturally, if the number is valid and available the user will soon receive notice of the incoming call. This preferably occurs while the user still has access to the Web-based directory. In one embodiment, an on-screen message will be sent to the user indicating the status of the conference call. In this way a user that for some reason has not been called but nevertheless has received a message that the user has been contacted may realize that incorrect contact information has been entered and interrupt the call before it proceeds so that an appropriate correction may be made. A correctly-called user may verify the voice connection either by sending a message to the Web-based directory server using or by responding during the voice call itself.

Of course, the chance that an incorrect number has been entered is one reason why the call to the user may be placed first. But if the user is a directory entity, there may be no need to wait to call the remaining party or parties. In another embodiment, the selected directory entity may be called first, so that the requesting user is not contacted for voice communication until it can be verified that the entity is itself available. This may be useful, for example, where the directory entity is an individual and is not expected to maintain constant availability.

In any case, the conferencing system 115 monitors the progress of the placed calls (step 245) to ensure that all necessary connections have been made and are being maintained. That is, it determines when the conference call begins and ends. Where successful connection to all parties has not been made within a pre-determined time period, the conferencing system may terminate all existing connections being used for the same call (step not shown), although it may first confirm that the connect party or parties wish to end the session. Once a call has been established, the conferencing system waits until one of the voice connections has been terminated. At that time it terminates all other connections involved in the call (step 250), although in this event it may also seek confirmation from the callers that this action is appropriate (step not shown).

In certain applications, the conferencing system may not monitor the entire call. This may occur, for example, where User 1 (shown in FIG. 1) establishes voice communication with SIP phone 140 using a softphone program resident on PC 122. Because the voice communication session is being conducted entirely through the Internet, each party can simply be provided with the Internet address of the other so that the session may continue (or even be initiated) without any other involvement of the conferencing system 115. In another embodiment, the automatic calling function could be accomplished by the conferencing system 115 sending a voice telephone number to the softphone program on PC 122 along with an instruction for the PC to call the number and establish a voice communication session. Naturally, the softphone program would have to be able to follow such instruction for this action to occur. (Of course, in some cases the Web-based directory operator may wish to remain involved in any call initiated though the directory for other reasons.)

Note that as used herein, the term 'automatically' refers to the action of the Web-based directory automatic call system 105, and specifically the conferencing system 115, in initiating (that is, setting up or at least attempting to set up) a voice communication session when requested to do so, usually by the user. Note also that FIG. 1 is a functional block diagram, so the directory storage and conferencing functions may actually reside in a single component, or in a plurality of components that are not necessarily co-located. Finally, note that the server 110 must include or be in communication with a database (note shown) or other memory device for storing the Web-based directory and related information. This database may incorporate several different storage devices that may not, and in some embodiments will not, be physically co-located with each other or with the server 110.

When the call has ended, any necessary billing information is recorded (step 255). According to a pre-determined billing scheme, the requesting user or the contacted entity may be charged for using the Web-based directory automatic-calling service, and may be charged for tolls associated with the call itself. For example, even if the Web-based directory service is provided free off charge to users there may be long distance charges applicable to one or all of the parties. Which party will actually pay for these charges will vary according to the purpose of the directory. In some applications, these charges will fall upon the user requesting the call. In other cases, a business that is using the Web-based directory as a form of advertising may pay for any applicable tolls so as not to discourage potential callers. Naturally, any entity that will incur charges will preferably be notified and given the opportunity to decide whether to permit sessions for which they will be charged.

Figure 3:
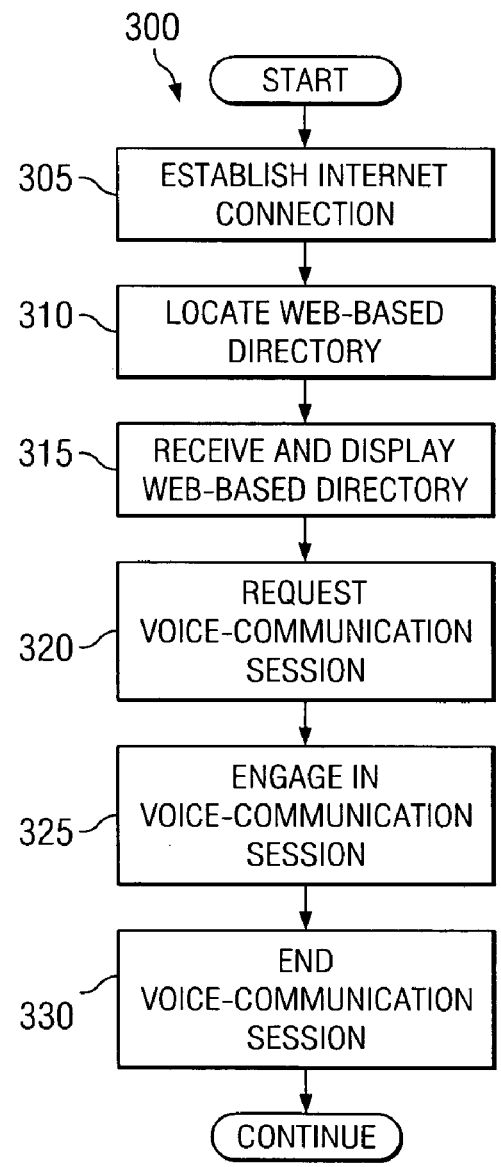
FIG. 3 is a flow diagram illustrating a method of using a Web-based directory service to find a SIP phone or other device and establish a voice communication session.

FIG. 3 is a flow diagram illustrating a method 300 of using a Web-based directory service to find and establish a voice communication session with one or more SIP phones or other entities according to an embodiment of the present invention. As mentioned above, it may be difficult for standard wireline or cellular telephones to contact users of SIP phones in any other fashion. At START, it is again assumed that a Web-based directory has been populated with entries. A user, such as User 1 shown in FIG. 1 establishes an Internet connection (step 305), in this case through ISP server 135. The user then locates the Web-based directory (step 310), for example by entering a known URL or by performing a search using a Web search engine. The located directory is then received and displayed on the display monitor of PC 122 (step 315), where it can be viewed by the user. If necessary, the user manipulates the directory for easier review (step not shown), for example by resorting the entries, or selecting only certain ones for display. In some embodiments, the user may also request additional information concerning a directory entry.

Figure 4:
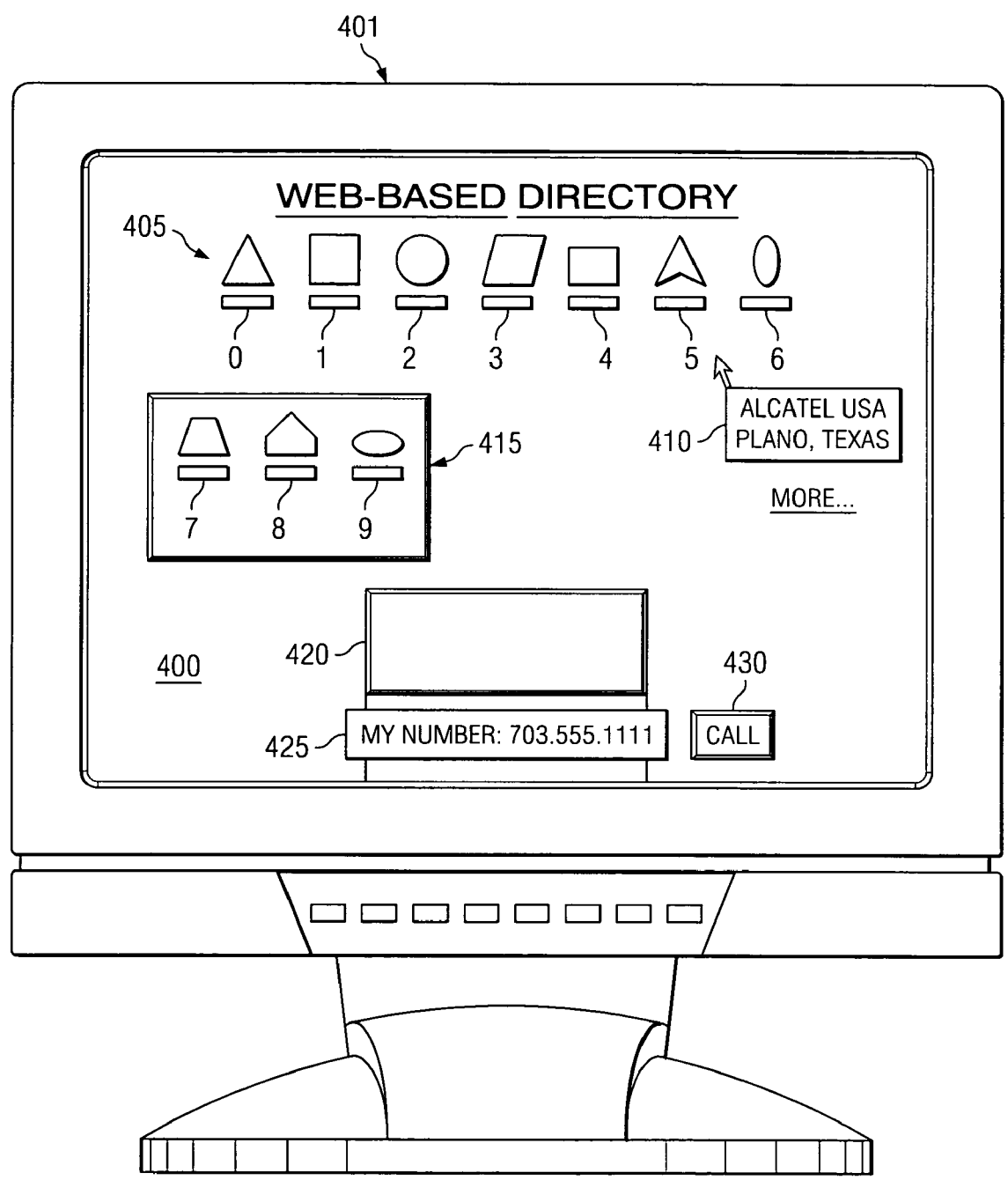
FIG. 4 is an exemplary screen display showing a number of icons, each associated with an entity that can be contacted through a Web-based directory according to an embodiment of the present invention.

FIG. 4 is an exemplary screen display 400 showing a number of icons, each associated with an entity that can be contacted through a Web-based directory according to an embodiment of the present invention. Display 400 is exemplary of one that may appear on display monitor 401 associated with a PC, such as PC 122 shown in FIG. 1. In the embodiment of FIG. 4, the display 400 includes a plurality of individual icons, enumerated 0 through 9. In this illustration the icons are shown in block form although in actual directories they may also take the form of pictures or company logos that have a recognizable association with the listed entity. Icons 0 through 6 appear in the main area 405 of the directory, where all of them were originally displayed. In this illustration, the user has requested additional information about the entity associated with 5, perhaps by using a secondary mouse button (sometimes called "right-clicking"), and has been presented with a pop-up window 410 providing the additional information. Icons 7 through 9 have been moved ("dragged") by the user to reserve area 415. In this embodiment, dragging an icon to reserve area 415 means that the user is considering a call to one or more of these 'reserved' entities and has placed them in a convenient area so that they remain visible while the remainder of the directory is perused. Note that in some cases there may be hundreds of directory entries, and to view them all the user may have to scroll through many pages or request more entries from the server 110, or both. In the embodiment of FIG. 4, the user may click on the "more . . ." link to receive additional selections from which to choose.

In the embodiment of FIG. 4, when the user decides which entity to actually contact, the icon associated with that entity is dragged to the call area 420 (which in FIG. 4 is now empty). The user's telephone number for voice contact appears in the window 425, meaning that it was already been entered by the user. As mentioned previously, this entry may have taken place during the current session, or the number may have been collected during sign-on or even during a previous session. However obtained, the user's telephone number is preferably displayed so that it can be verified and changed if necessary. When a user contact number is shown in window 425 and one or icons appear in call area 420, the user may send a request to the Web-based directory server to initiate a voice call by clicking on the "call" button 430.

Note that the Web-based directory display may be more or less elaborate than the one shown in FIG. 4. The display may need to be nothing more than a listing of names, and the user initiates voice communication simply be clicking on one of the names, or by highlighting one or more of them and then activating a the call feature in some way, such as by pressing the "enter" key on PC 122. Note also that in this embodiment the user is not informed of the type of connection that will be used when the voice call is initiated. In another embodiment, so informing the user or even providing a selection of contact alternatives may be desirable. The user, for example, may not even be aware that an entity listed in the Web-based directory even has a SIP phone. By selecting that mode of communication, the user may be able to save toll charges that would otherwise accrue during the call.

Returning to FIG. 3, when the desired entity or entities have been identified, the user requests that a voice communication session be initiated (step 320). The user then answers the call received on, for example, telephone 124 shown in FIG. 1. At approximately the same time, the entity or entities that the user requested voice contact with will also answer and enter the conference call, and the parties engage in the voice communication session (step 325) until it is ended by one or both of them (step 330). The process continues when the user accesses the Web-based directory to initiate another call.

In this way the automatic call Web-based directory is able to provide a way for users to reach entities though a SIP phone or other device regardless of whether they have a Web site, or even an email address through which they may be contacted. The entity may even be an individual. Users are permitted to establish, or at least to attempt to establish a voice communication session with the business or individual entity even though the entity has an unlisted number. That is, the number or IP address being called by the conferencing system need not be disclosed to the user. Entities may of course request that some level of user identity be established by the Web-based directory server before the voice session is initiated, and may further request that voice communications be limited to certain users.

The previous descriptions are of preferred examples for implementing the invention, and the scope of the invention should not necessarily be limited by this description. The scope of the present invention is defined by the following claims:

What is claimed is:

1. A method of providing Web-based directory services to establish a voice communication session with an IP-based telephone, said method comprising the steps of:

populating a database with directory entries, each entry being associated with an entity and including information relating to establishing a voice communication session with the entity;

receiving, in an Internet accessible server in communication with the database, a user request to provide directory information, wherein the request includes an address to which the requested information may be sent;

transmitting directory information from the server to the address included in the request, the directory information including at least one directory entry;

receiving in the server a request to establish a voice communication session with the entity associated with the at least one directory entry;

determining a manner of establishing voice communication with the user;

initiating the requested voice communication session using a conferencing system coupled to the server by initiating a call to at least one of the entity and the user by initiating a voice call to the user and waiting until the call to the user has been terminated at a user device to initiate a voice call to the entity;

determining that the voice call to the entity has not been terminated within a predetermined time period; and transmitting a message to the user indicative of the non-responsiveness of the entity.

2. The method of claim 1, wherein the message is an audio message transmitted to the user via the voice call terminated at the user device.

3. The method of claim 1, wherein the message is transmitted to the user via the Internet.

4. The method of claim 1, further comprising the step of monitoring the voice communication session, if any, to determine when the voice call to any party has been ended.

5. The method of claim 4, further comprising the step of ending the voice calls to all parties upon determining that the voice call to any party has been ended.

6. The method of claim 5, further comprising the step of transmitting a query to each party, if any, for which a voice call is still in progress asking if the remaining voice calls, if any, should be terminated.

7. The method of claim 1, further comprising the step of transmitting, prior to the step of transmitting directory information from the server, a request for information relating to the user.

8. The method of claim 7, wherein the requested information relating to the user includes a password.

9. The method of claim 7, further comprising the step of receiving information in response to the request for user-related information.

10. The method of claim 9, wherein the directory information transmitting from the server varies as a function of the information received in response to the request for user-related information.

11. The method of claim 1, wherein the step of determining a manner of establishing voice communication with the user comprises the steps of transmitting a query to the user and receiving a response.

12. The method of claim 1, wherein the step of determining a manner of establishing voice communication with the user comprises the steps of transmitting a query to a database in the user and receiving a response.

13. The method of claim 1, further comprising that step of storing billing information relating to the voice communication session, if any, so that at least one of the entity and the user can be billed for charges incurred, if any.

14. A system for providing Web-based directory services in response to a request from a user to establish a voice communication session with an IP-based telephone, comprising:

a server in communication with Internet for receiving requests for the Web-based directory services and for transmitting directory information to the user;

a database in communication with the server for storing information relating to at least one Web-based directory, the Web-based directory including an IP address for establishing voice contact relating to at least one entity; and a conferencing system for placing a voice call to the user and to the at least one entity in response to a user request in an attempt to establish a voice communication session between the user and the entity by initiating a voice call to the user and waiting until the call to the user has been terminated at a user device to initiate a voice call to the entity, the conferencing system further for determining that the voice call to the entity has not been terminated within a predetermined time period and transmitting a message to the user indicative of the non-responsiveness of the entity.

15. The system of claim 14, wherein the system monitors the voice communication session, if any, to determine when it ends.

16. The system of claim 15, wherein the at least one entity is allowed to alter information relating to it that is stored on the database.

17. The system of claim 15, wherein the system verifies the identity of the user prior to placing a voice call to the at least one entity.

18. The system of claim 15, wherein the system verifies the identity of the user prior to transmitting directory information to the user.

19. The system of claim 14, wherein the Web-based directory includes information relating to a plurality of entities.

20. The system of claim 19, wherein the conferencing system if for placing a voice call to the user and to each of a selected number of the plurality of entities to establish a voice communication session between the user and the selected entities.

21. The system of claim 20, wherein the selected number of the plurality of entities is selected by the user.

22. The system of claim 14, wherein the IP-based telephone is operable according to the session initiation protocol (SIP).

* * * * *